(12) United States Patent
Hashizume

(10) Patent No.: US 8,172,934 B2
(45) Date of Patent: May 8, 2012

(54) COLORED FLAKE PIGMENT AND COATING COMPOSITION CONTAINING THE SAME

(75) Inventor: Yoshiki Hashizume, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 473 days.

(21) Appl. No.: 11/883,021

(22) PCT Filed: Feb. 22, 2005

(86) PCT No.: PCT/JP2005/002770
§ 371 (c)(1),
(2), (4) Date: Jul. 25, 2007

(87) PCT Pub. No.: WO2006/090431
PCT Pub. Date: Aug. 31, 2006

(65) Prior Publication Data
US 2008/0115693 A1   May 22, 2008

(51) Int. Cl.
*C09C 1/62* (2006.01)
(52) U.S. Cl. ...................................................... 106/404
(58) Field of Classification Search .................. 106/403, 106/404, 415, 416, 14.21, 31.6, 31.9, 456; 427/214; 523/171
See application file for complete search history.

(56) References Cited

U.S. PATENT DOCUMENTS

| | | | |
|---|---|---|---|
| 4,772,331 A | 9/1988 | Noguchi et al. | |
| 4,937,274 A * | 6/1990 | Arima et al. | 523/220 |
| 5,037,475 A | 8/1991 | Chida et al. | |
| 5,931,996 A | 8/1999 | Reisser et al. | |
| 5,944,886 A * | 8/1999 | Hashizume | 106/404 |
| 5,964,936 A | 10/1999 | Reisser | |
| 6,203,909 B1 * | 3/2001 | Chassot | 428/403 |
| 2003/0209169 A1 * | 11/2003 | Andes et al. | 106/415 |
| 2004/0194663 A1 * | 10/2004 | Li et al. | 106/403 |
| 2006/0047018 A1 * | 3/2006 | Li et al. | 523/171 |

FOREIGN PATENT DOCUMENTS

| | | |
|---|---|---|
| CN | 1312840 A | 9/2001 |
| EP | 0 769 535 A2 | 4/1997 |
| JP | 58-141248 A | 8/1983 |
| JP | 1-315470 A | 12/1989 |
| JP | 2-16168 A | 1/1990 |
| JP | 3-153765 A | 7/1991 |
| JP | 5-508424 A | 11/1993 |
| JP | 6-11871 B2 | 2/1994 |
| JP | 8-188723 A | 7/1996 |
| JP | 8-231882 A | 9/1996 |
| JP | 8-259840 A | 10/1996 |
| JP | 10-513206 A | 12/1996 |
| JP | 9-40885 A | 2/1997 |
| JP | 9-59532 A | 3/1997 |
| JP | 9-124973 A | 5/1997 |
| JP | 9-316357 A | 12/1997 |
| JP | 11-510527 A | 9/1999 |
| JP | 2002-256151 A | 9/2002 |
| JP | 2003-96334 A | 4/2003 |
| JP | 2004-124069 A | 4/2004 |
| WO | WO-91/04293 A1 | 4/1991 |

OTHER PUBLICATIONS

Supplementary European Search Report for European Patent Appl. No. 05 71 0501, mailed Jun. 10, 2009.
Chinese Office Action issued on May 7, 2010 in corresponding Chinese Patent Application No. 200580048137.3.
Japanese Office Action mailed Feb. 8, 2011 in corresponding Japanese Patent Application No. 2005-027558.

* cited by examiner

*Primary Examiner* — Jerry Lorengo
*Assistant Examiner* — Carlos Barcena
(74) *Attorney, Agent, or Firm* — Birch, Stewart, Kolasch & Birch, LLP

(57) ABSTRACT

A colored flake pigment excelling in designability and weather resistance; and a coating composition containing the same. There is provided a colored flake pigment comprising a flaky base material of ≦80% light reflectance in a 300 to 600 nm wavelength region composed of a composite of metal and metal oxide, which flaky base material has preferably a specified pigment attached thereto. Further, there is provided a coating composition containing the colored flake pigment. The flaky base material is preferably a composite of copper, or copper alloy, and metal oxide.

6 Claims, No Drawings

COLORED FLAKE PIGMENT AND COATING COMPOSITION CONTAINING THE SAME

TECHNICAL FIELD

The present invention relates to a colored flake pigment excellent in designability and weather resistance and a coating composition containing the same.

BACKGROUND ART

A coating material composed of metal flakes such as aluminum flakes and a coloring pigment is generally employed for providing glossiness in metallic coating applied to a mechanical product or a plastic product. In particular, a colored flake pigment comprising a metallic flake pigment and a coloring pigment bonded thereto, has excellent performance in such points that a vivid color tone can be obtained and concealment of a base color is excellent. An organic pigment such as a diketopyrrolopyrrole-based pigment, a quinacridone-based pigment, a dioxazine-based pigment, an isoindolinone-based pigment, a condensed azo-based pigment, a threne-based pigment, a perynone-based pigment, a perylene-based pigment, a quinophthalone-based pigment or a phthalocyanine-based pigment or an inorganic pigment such as iron oxide or carbon black is used for such a colored flake pigment.

For example, Japanese Patent Laying-Open No. 58-141248 (Patent Document 1) proposes a colored metallic pigment prepared by homogeneously bonding a coloring pigment to the surface of a metallic pigment with a polymer composed of a monomer having polymerizable double bonds, National Patent Publication Gazette No. 5-508424 (Patent Document 2) proposes a colored pigment composed of a combination of fragments of metal and a polymer matrix held thereon for pocketing a solid colorant in particular, Japanese Patent Laying-Open No. 1-315470 (Patent Document 3) proposes a primary colored metallic pigment prepared by chemisorbing a coloring pigment onto the surface of a metallic pigment through carboxylic acid having at least one double bond and at least two carboxyl groups obtained by thermally polymerizing at least one carboxylic acid having double bonds, Japanese Patent Laying-Open No. 9-40885 (Patent Document 4) proposes a surface treated colored pigment prepared by covering the surface of a colored pigment with 0.2 to 100 parts by weight of monobasic aromatic carboxylic acid with respect to 100 parts by weight of the colored pigment, Japanese Patent Laying-Open No. 9-59532 (Patent Document 5) proposes a colored metallic flake pigment having an evaporated layer of an organic coloring pigment on the surface thereof and Japanese Patent Laying-Open No. 9-124973 (Patent Document 6) proposes a surface treated colored pigment prepared by covering the surface of a colored pigment with 0.2 to 100 parts by weight of an amino compound having two amino groups in each molecule with no carboxyl group with respect to 100 parts of the colored pigment respectively.

However, each of these colored metallic flake pigments has such a problem that the coloring pigment bonded to the surface is easily photo-deteriorated due to reflection of light on the surface of the pigment composed of aluminum or the like. Particularly in the color gamuts of yellow and red, it has been difficult to obtain a colored aluminum pigment having both of weather resistance and designability.

Patent Document 1: Japanese Patent Laying-Open No. 58-141248

Patent Document 2: National Patent Publication Gazette No. 5-508424

Patent Document 3: Japanese Patent Laying-Open No. 1-315470

Patent Document 4: Japanese Patent Laying-Open No. 9-40885

Patent Document 5: Japanese Patent Laying-Open No. 9-59532

Patent Document 6: Japanese Patent Laying-Open No. 9-124973

DISCLOSURE OF THE INVENTION

Problems to be Solved by the Invention

An object of the present invention is to provide a colored flake pigment excellent in designability and weather resistance and a coating composition containing the same by solving the aforementioned problem and using a flaky base material having a specific surface.

Means for Solving the Problems

The present invention relates to a colored flake pigment comprising a flaky base material and a pigment bonded to the flaky base material, the flaky base material is composed of a composite of metal and metal oxide, having light reflectance of not more than 80% in a wave range of 300 nm to 600 nm and a coloring composition containing the same.

As the pigment, at least one pigment selected from a diketopyrrolopyrrole-based pigment, a quinacridone-based pigment, a perylene-based pigment, a perynone-based pigment, a dioxazine-based pigment, an anthraquinone-based pigment, an isoindolinone-based pigment, an isoindoline-based pigment, an indanthrone-based pigment, an ansanthrone-based pigment, a flavanthrone-based pigment, a pyranthrone-based pigment, a benzoimidazolone-based pigment, a phthalone-based pigment, a quinophthalone-based pigment, a triphenylmethane quinophthalone-based pigment, an anthrapyrimidine-based pigment, a thioindigo-based pigment, a phthalocyanine-based pigment, a phthalocyanine halide-based pigment, an azomethine metal complex-based or condensed azo-based pigment or another azo pigment, a chrome yellow-based pigment, titanium oxide, iron oxide, carbon black, ultramarine, iron blue, cobalt blue, chrome green, bismuth vanadate and spinel is preferably employed.

The flaky base material in the present invention is preferably a composite of copper or copper alloy and metal oxide, and the flaky base material is also preferably composed of aluminum flakes covered with iron oxide.

The colored flake pigment according to the present invention preferably has an average particle diameter in the range of 1 to 50 µm, an average thickness in the range of 0.1 to 2 µm and true specific gravity in the range of 2 to 6.

Further, the surface of the colored flake pigment according to the present invention is preferably at least partially covered with resin.

Effects of the Invention

According to the present invention, a colored flake pigment excellent in designability and weather resistance and a coating composition containing the same can be proposed by using a flaky base material having a specific surface.

BEST MODES FOR CARRYING OUT THE INVENTION

The present invention is now described in more detail with reference to an embodiment.

<Flaky Base Material>

The feature of the present invention resides in a point that a flaky base material, composed of a composite of metal and metal oxide, having light reflectance of not more than 80% in a wave range of 300 nm to 600 nm is used as the base material for the colored flake pigment. Thus, a colored aluminum pigment having excellent weather resistance is obtained also when a yellow-based or red-based coloring pigment, having heretofore been regarded as difficult due to the problem of weather resistance, is used. The flaky base material having the light reflectance of not more than 80% in the wave range of 300 nm to 600 nm is so employed that a light component having high energy is absorbed on the surface of the base material, whereby photodeterioration of the coloring pigment is reduced. Therefore, a colored flake pigment having excellent weather resistance can be provided. If the flaky base material has light reflectance exceeding 80% in the wave range of 300 nm to 600 nm, photodeterioration of the coloring pigment cannot be sufficiently reduced, and the target weather resistance cannot be attained.

In the colored flake pigment according to the present invention, the flaky base material is composed of a composite of metal and metal oxide. In the present invention, the "composite of metal and metal oxide" includes a composite prepared by partially or entirely covering the surface of metal with metal oxide, a composite of metal and metal oxide forming a layer structure formed by a single layer or a plurality of layers and the like, while a mode of compositing the metal and the metal oxide is not restricted but the composite may simply have a flaky form. The flaky base material is previously colored with the metal oxide, whereby a vivid color tone is obtained also when the quantity of the pigment bonded onto the same is reduced. In the technique of a conventional colored aluminum pigment, it has been necessary to use a large quantity of coloring pigment in order to obtain a vivid color tone, whereby the thickness of the colored flake pigment has been so increased as a result that it has been difficult to obtain an excellent film appearance. According to the present invention, the quantity of the bonded pigment can be so reduced that a coating film excellent in both chroma and film appearance is obtained.

The flaky base material, composed of the composite of metal and metal oxide, having the light reflectance of not more than 80% in the wave range of 300 nm to 600 nm is prepared from oxide-covered aluminum flakes obtained by covering aluminum flakes with ultrafine particles of iron oxide, bismuth vanadium or a spinel pigment, aluminum flakes obtained by forming single-layer or multilayer colored films of iron oxide, aluminum oxide, silicon oxide, titanium oxide, chromium oxide or metal, surface-oxidized metallic flakes of copper, zinc, tin, nickel, titanium or the like or an alloy thereof, or the like. When surface-oxidized metallic flakes are used, the oxygen content in the metallic flakes is preferably in the range of 0.5 to 10 mass %. Light reflectance in the wave range of 300 nm to 600 nm can be so efficiently reduced that sufficient weather resistance is attained if the oxygen content is at least 0.5 mass while brightness of the metallic flakes is not reduced if the oxygen content is not more than 10 mass %.

As a method of oxidizing the surfaces of the metallic flakes, a method heating the metallic flakes in an oxygen-present atmosphere, a method leaving the metallic flakes in a vapor-present atmosphere for a desired period or the like can be listed.

A flaky base material particularly preferable in the present invention is composed of surface-oxidized copper flakes or iron oxide-covered aluminum flakes. The iron oxide-covered aluminum flakes can be preferably prepared by bonding ultrafine particles of iron oxide (hematite) or ferric hydroxide (goethite) having particle diameters of about 10 to 80 nm, by thermally decomposing/precipitating carbonyl iron on the surfaces of aluminum flakes by CVD or neutralizing/precipitating ferric chloride, ferric sulfate or the like in an aqueous solution.

<Coloring Pigment>

An organic pigment such as a diketopyrrolopyrrole-based pigment, a quinacridone-based pigment, a perylene-based pigment, a perynone-based pigment, a dioxazine-based pigment, an anthraquinone-based pigment, an isoindolinone-based pigment, an isoindoline-based pigment, an indanthrone-based pigment, an ansanthrone-based pigment, a flavanthrone-based pigment, a pyranthrone-based pigment, a benzoimidazolone-based pigment, a phthalone-based pigment, a quinophthalone-based pigment, a triphenylmethane quinophthalone-based pigment, an anthrapyrimidine-based pigment, a thioindigo-based pigment, a phthalocyanine-based pigment, a phthalocyanine halide-based pigment, an azomethine metal complex-based or condensed azo-based pigment or another azo pigment, or an inorganic pigment such as a chrome yellow-based pigment, titanium oxide, iron oxide, carbon black, ultramarine, iron blue, cobalt blue, chrome green, bismuth vanadate or spinel can be illustrated as the coloring pigment used in the present invention. More specifically, the following pigment, i.e., pigment orange 71, pigment orange 73, pigment red 254, pigment red 255, pigment red 264, pigment red 270, pigment red 272, pigment violet 19, pigment red 122, pigment red 202, pigment red 206, pigment red 207, pigment red 209, pigment orange 48, pigment red 123, pigment red 149, pigment red 178, pigment red 179, pigment red 190, pigment red 224, pigment violet 29, pigment orange 43, pigment red 194, pigment violet 23, pigment violet 37, pigment yellow 24, pigment yellow 108, pigment orange 51, pigment red 168, pigment red 177, pigment yellow 109, pigment yellow 110, pigment yellow 173, pigment orange 61, pigment yellow 129, pigment yellow 153, pigment yellow 65, pigment orange 68, pigment red 257 or the like can be used.

A single such pigment may be employed, or such pigments may be employed in a mixed state. A coloring pigment having a primary particle diameter preferably in the range of 0.01 to 1 μm, more preferably in the range of 0.02 to 0.1 μm can be used. There is a small possibility that the pigment is hard to disperse if the primary particle diameter is at least 0.01 μm, while there is a small possibility that it is difficult to homogeneously bond the pigment to the flaky base material if the primary particle diameter is not more than 1.0 μm.

The coverage of the coloring pigment is preferably in the range of 0.5 to 50 parts by mass, more preferably in the range of 2 to 30 parts by mass with respect to 100 parts by mass of the flaky base material. The coverage of the coloring pigment is preferably increased/decreased in response to the specific surface area of the flaky base material. Sufficient chroma can be attained if the coverage of the coloring pigment is at least 0.5 parts by mass, while there is a small possibility that metallic feel is reduced but brightness of the colored flake pigment is sufficiently attained if the coverage is not more than 50 parts by mass.

A method of bonding the coloring pigment to the flaky base material is not particularly restricted but a method described in any well-known technical document such as the aforementioned Patent Documents 3 to 6, for example, can be preferably used.

<Method of Preparing Colored Flake Pigment>

The most preferable method of bonding the coloring pigment to the surface of the flaky base material is a method covering the bonded coloring pigment with an amino compound having two amino groups in each molecule with no carboxyl group or monobasic aromatic carboxylic acid for improving bondability and bonding the coloring pigment to the flaky base material through hetero-agglutination in a nonpolar solvent. A surface active agent, a pigment dispersant such as a chelate compound or an ultraviolet absorber may be bonded to the coloring pigment, in addition to the aforementioned compound.

As examples of the amino compound having two amino groups with no carboxyl group, the following ones can be illustrated: That is, ethylenediamine, trimethylenediaamine, tetramethylenediamine, pentamethylenediamine, hexamethylenediamine, 1,7-diaminoheptane, 1,8-diaminooctane, 1,10-diaminodecane, 1,12-diaminododecane, o-phenylenediamine, m-phenylenediamine, p-phenylenediamine, 1,8-diaminonaphthalene, 1,2-diaminocyclohexane, stearylpropylene diamine, N-β-(aminoethyl)-γ-aminopropyltrimethoxysilane, N-β-(aminoethyl)-γ-aminopropylmethyldimethoxysilane and the like can be listed.

As examples of the monobasic aromatic carboxylic acid, the following ones can be illustrated: That is, benzoic acid, vinyl benzoate, salicylic acid, anthranilic acid, m-aminobenzoic acid, p-aminobenzoic acid, 3-amino-4-methylbenzoic acid, p-aminosalicylic acid, 1-naphthoic acid, 2-naphthoic acid, naphthenic acid, 3-amino-2-naphthoic acid, cinnamic acid, aminocinnamic acid and the like can be listed.

The content of the amino compound having two amino groups with no carboxyl group or the monobasic aromatic carboxylic acid is preferably in the range of 0.2 to 100 parts by mass, more preferably 0.5 to 50 parts by mass with respect to 100 parts by mass of the coloring pigment.

More specifically, the following steps, for example, are illustrated in relation to a preferable method of bonding the coloring pigment to the flaky base material, the present invention is not restricted to this method.

1) Under the presence of the aforementioned amino compound having two amino groups with no carboxyl group or the amino compound having two amino groups with no carboxyl group and the monobasic aromatic carboxylic acid, a dispersing element of the coloring pigment is prepared by dispersing the coloring pigment in a nonpolar solvent while adding a surface active agent or a dispersant such as a chelate compound if necessary. Aliphatic hydrocarbon or aromatic hydrocarbon having a boiling point in the range of about 100 to 250° C. or a mixture thereof can be preferably used as the nonpolar solvent. More specifically, normal paraffin, isoparaffin, toluene, xylene, solvent naphtha, kerosene, mineral spirit or petroleum benzine can be listed. A small quantity of alcohol or ester-based solvent may be added as an adjuvant for dispersing the pigment.

A dispersion method using a grinding medium with a ball mill, a bead mill or a sand mill is preferably employed as the method of dispersing the coloring pigment.

2) The flaky base material is added to and dispersed in the dispersing element of the coloring pigment prepared through 1), so that the coloring pigment is bonded to the surface of the flaky base material (primary coloring). In order to improve bondability of the coloring pigment to the surface of the flaky base material, the flaky base material preferably contains no organic additive such as aliphatic acid. The surface of the flaky base material may be previously covered with a compound having inorganic acid groups or the like if necessary, so that the coloring pigment is easily bonded to the surface. In this case, the compound having inorganic acid groups or the like has a function of improving bondability of the coloring pigment by increasing the number of active spots on the surface of the flaky base material. As a dispersion method in the aforementioned primary coloring, stirring with a stirrer or a disper is also preferable in addition to the aforementioned dispersion method using a grinding medium.

As examples of the aforementioned compound having inorganic acid groups, carbonic acid, boric acid, sulfuric acid, nitric acid, phosphoric acid, phosphorous acid, hypophosphorous acid, silicic acid, chromic acid, molybdic acid, tungstic acid, titanic acid, vanadic acid, tantalic acid and condensates thereof can be listed. In particular, phosphoric acid, molybdic acid, tungstic acid and vanadic acid as well as pyrophosphoric acid, polyphosphoric acid, polymolybdic acid, polytungstic acid, phosphomolybdic acid and phosphotungstic acid corresponding to condensates thereof are particularly preferable. Polymolybdic acid and polytungstic acid also include polyacid peroxide, expressed in a general formula $M_xO_y \cdot mH_2O_2 \cdot nH_2O$ (where it is assumed that M represents metal Mo or metal W and m, n, X and Y represent positive integers), induced from hydrogen peroxide and metal Mo or metal W.

The quantity of the inorganic acid groups is preferably in the range of 0.05 to 5 parts by mass with respect to 100 parts by mass of the flaky base material. The coloring pigment can be sufficiently bonded to the surface of the flaky base material if the quantity of the inorganic acid groups is at least 0.05 parts by mass, while a problem such as agglutination of the flaky base material hardly arises if the quantity is not more than 5 parts by mass.

While a method of adsorbing the compound having inorganic acid groups to the surface of the flaky base material is not particularly restricted, a method adding a material prepared by dissolving acid or a compound such as ammonium salt having inorganic acid groups in water or a hydrophilic solvent such as an alcohol-based solvent, a glycol ether-based solvent or a ketone-based solvent to a mixture of an organic solvent and the flaky base material and stirring/mixing or kneading the mixture in the state of slurry or paste for reacting and adsorbing the inorganic acid groups on and to the surface of the flaky base material is preferable.

In this case, the solvent is preferably in the range of 300 to 3000 parts by mass, more preferably in the range of 500 to 1500 parts by mass with respect to 100 parts by mass of the flaky base material. The viscosity of the solution is so moderately increased that the flaky base material can be homogeneously dispersed if the usage of the solvent is at least 300 parts by mass, while the time required for adsorption can be relatively short if the usage of the solvent is not more than 3000 parts by mass.

3) The coloring pigment can be more strongly bonded to the flaky base material by at least partially covering the surface of the colored flake pigment formed by bonding the coloring pigment to the flaky base material in the aforementioned method with resin if necessary. While the surface of the colored flake pigment is preferably completely covered with resin, bondability of the coloring pigment can be improved also when the surface is not completely covered. The quantity of the resin is suitably 0.5 to 100 parts by mass, more preferably 5 to 30 parts by mass with respect to 100 parts by mass of the flaky base material. The coloring pigment tends to hardly drop if the quantity of the resin is at least 0.5 parts by mass, while metallic feel and smoothness of the coating film tend to be excellent if the quantity of the resin is at least 0.5 parts by mass to the contrary.

As a method of covering the primarily colored flake pigment with the resin, a method adding a monomer described later and a polymerization initiator such as benzoyl peroxide, isobutyl peroxide or azobisisobutylonitrile to a dispersing element prepared by dispersing the primarily colored flake pigment in a hydrocarbon-based or alcohol-based solvent, particularly preferably in a hydrocarbon-based solvent, heating the mixture while stirring the same for polymerizing the monomers and precipitating the same on the surface of the flake pigment is preferable. The polymerization is preferably performed in an oxygen-free atmosphere or inert gas such as nitrogen or argon, for example. The reaction temperature is suitably in the range of 50 to 150° C., more preferably in the range of 70 to 100° C. There is a small tendency that efficiency of the polymerization is insufficient if the reaction temperature is at least 50° C., while there is a small possibility that the polymerization abruptly progresses and there is a tendency that a sufficient quantity of polymer can be easily precipitated on the surface of the colored flake pigment if the reaction temperature is not more than 150° C.

As examples of the monomer polymerized in the above, the following ones can be illustrated: That is, acrylic acid, methacrylic acid, methyl methacrylate, butyl methacrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, butyl methacrylate, octyl methacrylate, 1,4-butanediol diacrylate, 1,6-hexanediol diacrylate, 1,9-nonanediol diacrylate, neopentylglycol diacrylate, tripropyleneglycol diacrylate, tetraethyleneglycol diacrylate, trimethylolpropane triacrylate, tetramethylolmethane tetraacrylate, pentaerythritol triacrylate, trisacryloxyethyl phosphate, ditrimethylolpropane tetraacrylate, styrene, α-methylstyrene, vinyltoluene, divinylbenzene, acrylonitrile, methacrylonitrile, vinyl acetate, vinyl propionate, maleic acid, crotonic acid, itaconic acid, polybutadiene, linseed oil, soybean oil, epoxidized soybean oil, epoxidized polybutadiene, cyclohexenevinyl monoxide, divinylbenzene monoxide and the like can be listed.

The colored flake pigment obtained in the present invention preferably has an average particle diameter in the range of 1 to 50 μm, an average thickness in the range of 0.1 to 2 μm and true specific gravity in the range of 2 to 6. Sufficient metallic feel is obtained and designability is excellent if the average particle diameter is at least 1 μm. Surface roughness of the coated surface is not excessively increased but an excellent film appearance is obtained if the average particle diameter is not more than 50 μm. The thickness of the colored layer is not excessively reduced but sufficient chroma is obtained if the average thickness is at least 0.1 μm. The coating film is sufficiently concealed and the surface roughness of the coated surface is not excessively increased but an excellent film appearance is obtained if the average thickness is not more than 2 μm.

The true specific gravity of the colored flake pigment is calculated as follows:

$$\rho a = (Wb + Wp + Wr)/(Wb/\rho b + Wp/\rho p + Wr/\rho r)$$

ρa: true specific gravity of colored flake pigment
Wb: weight percentage of flaky base material in colored flake pigment
Wp: weight percentage of coloring pigment in colored flake pigment
Wr: weight percentage of resin in colored flake pigment
ρb: true specific gravity of coloring pigment
ρr: true specific gravity of resin If the colored flake pigment has such a composition that the true specific gravity is at least 2, there is a small possibility that the coloring pigment and the resin are excessive but sufficient metallic feel is obtained. If the colored flake pigment has such a composition that the true specific gravity is not more than 6, on the other hand, the colored flake pigment is hardly sedimented in the coating material but coating workability is excellent.

<Coating Composition>

The coating composition according to the present invention contains the colored flake pigment according to the present invention and a binder. The binder used for the coating composition according to the present invention is not particularly restricted but a binder generally employed for a coating composition containing an aluminum pigment or the like can be used. One or at least two types of resin materials can be used as the binder used for the coating composition according to the present invention.

As a specific example of the binder used for the coating composition according to the present invention, a combination of resin materials such as thermosetting acrylic resin/melamine resin, thermosetting acrylic resin/CAB/melamine resin, thermosetting polyester (alkyd) resin/melamine resin, thermosetting polyester (alkyd) resin/CAB/melamine resin, isocyanate cure urethane resin/cold setting acrylic resin or water dilution acrylic emulsion resin/melamine resin can be listed.

The solvent used for the coating composition according to the present invention is not restricted to an organic solvent but a general solvent employed for a coating composition containing an aluminum pigment or the like can be used, and a hydrophilic solvent such as water can also be used. If the coating composition according to the present invention is a powder coating composition, no solvent may be contained.

As a specific example of the solvent usable in the coating composition according to the present invention, an organic solvent of aliphatic hydrocarbon such as mineral spirit, hexane, heptane, cyclohexane or octane, aromatic hydrocarbon such as benzene, toluene or xylene, halogenated hydrocarbon such as chlorobenzene, trichlorobenzene, perchloroethylene or trichlroethylene, alcohol such as methanol, ethanol, n-propyl alcohol or n-butanol, ketone such as n-propanone or 2-butanone, ester such as ethyl acetate or propyl acetate or ether such as tetrahydrofuran, diethyl ether or ethylpropyl ether or a hydrophilic solvent such as water can be listed. At least to such solvents are preferably employed in a mixed state, and the composition of the solvent is decided in consideration of solubility of the binder, a film forming property, coating workability and the like.

If the coating composition according to the present invention is of a solution type, the usage of the solvent is preferably in the range of 50 to 3000 parts by mass, more preferably in the range of 250 to 1000 parts by mass with respect to 100 parts by mass of the colored flake pigment. If the usage is at least 50 parts by mass, viscosity of the coating composition is not excessively increased so that the colored flake pigment and the binder tend to be easily homogeneously diffused and coating workability is improved. If the usage is not more than 3000 parts by mass, on the other hand, the solid content of the coating film is not excessively reduced but the coating film can be prevented from reduction of metallic feel and brilliance of the film.

If the coating composition according to the present invention is employed as a powder coating material, the coating composition is preferably heated in the range of 50 to 150° C. while mixing the colored flake pigment of a pasty state under a pressure reduced to a level less than the atmospheric pressure for further removing the solvent, to be converted to a powdery state containing not more than 5 mass %, preferably not more than 2 mass % of the solvent.

An additive such as a pigment dispersant, a defoaming agent, an anti-setting agent or a curing catalyst or another coloring pigment other than the inventive colored flake pigment can be added to the coating composition according to the present invention if necessary.

The compounding ratio of the colored flake pigment compounded with the coating composition according to the present invention is preferably in the range of 0.1 to 50 parts by mass, more preferably in the range of 1.0 to 30 parts by mass with respect to 100 parts by mass of the binder. The target designability excellent in metallic feel cannot be attained if the content of the colored flake pigment is excessively small, while image clarity of the coating film tends to lower if the content is excessively large.

The coating composition according to the present invention can be preferably used in the fields of automobiles, motorcycles, bicycles, aircrafts, ships, other mechanical products, electric appliances, communication appliances, household goods, stationery, cosmetics, architectural structures and the like.

EXAMPLES

While the present invention is now described in more detail with reference to Examples, the present invention is not restricted to these.

Example 1

0.05 g of benzoic acid, 0.05 g of a dispersant (Prene Act ALM by Kawaken Fine Chemicals Co., Ltd.) and 30 g of mineral spirit were added to 5 g of a commercially available diketopyrrolopyrrole-based pigment (Irgazin DPP Rubine TR by Ciba Speciality Chemicals) and subjected to ball milling dispersion for 24 hours in a pot mill having a diameter of 5 cm and an internal volume of 500 cc loaded with 500 g of glass beads having a diameter of 1 mm. Thereafter 100 g of surface-oxidized copper powder having an average particle diameter of 10 μm, an average thickness of 0.8 μm and an oxygen content of 0.7% and 30 g of mineral spirit were added into this pot mill, and the mixture was further subjected to ball milling dispersion for 1 hour. Obtained slurry was washed out with 500 g of mineral spirit to be separated from the glass beads and thereafter filtrated, thereby obtaining a red colored flake pigment (primary colored flake pigment).

Then, 1.5 g of acrylic acid, 1.5 g of trimethylolpropane triacrylate, 1.5 g of styrene and 1.5 g of epoxidized polybutadiene were added to slurry obtained by dispersing 100 g (as a solid content) of the primary colored flake pigment obtained in the above in 500 g of mineral spirit and heated/stirred under a nitrogen atmosphere at 80° C. for polymerizing the monomers while adding 0.5 g of azobisisobutylnitrile as a polymerization initiator and precipitating the same on the surface of the primary colored aluminum pigment. The treated slurry was solid-liquid separated, for obtaining a pasty colored flake pigment having a solid content of 85%.

The obtained colored flake pigment exhibited an average particle diameter of 10 μm, an average thickness of 1.5 μm and true specific gravity of 5.3. The surface-oxidized copper powder employed at this time exhibited light reflectance of 54% in the wave range of 300 nm to 600 nm. Measurement methods for the respective characteristic values are as follows:

(1) Oxygen Content
According to inert gas fusion (EMGA2800 by Horiba, Ltd.)
(2) Average Particle Diameter
According to laser diffraction (Microtrac HRA by Honeywell International Inc.).
(3) Average Thickness
According to the average the thicknesses of 100 flakes obtained from cross-section observation of colored flakes with an optical microscope.
(4) True Specific Density
According to Archimedean method.
(5) Measuring Method and Measured Value of Light Reflectance in the Wave Range of 300 nm to 600 nm A sample prepared by coating an OHP film with the prepared coating material with a doctor blade of 100 μm under the following conditions was subjected to measurement from the back surface (opposite to the coated surface) of the OHP film with a spectroreflectometer "URE-30" by Ushio Inc. The average reflectance at 300 nm to 600 nm was calculated from the obtained spectral reflectance curve on the basis of the area rule.

Base material flake: 20 parts by mass (as a solid content)
Acrylic lacquer (Autoclear by Nippon Paint Co., Ltd.): 50 parts by mass The above was dispersed in a homomixer at 7000 rpm for 5 minutes, for obtaining a coating paint.

Example 2

0.1 g of benzoic acid, 0.1 g of a dispersant (Prene Act ALM by Kawaken Fine Chemicals Co., Ltd.) and 30 g of mineral spirit were added to 20 g of a commercially available quinacridone-based pigment (Shinkasha Red YRT-759-D by Ciba Speciality Chemicals) and subjected to ball milling dispersion for 24 hours in a pot mill having a diameter of 5 cm and an internal volume of 500 cc loaded with 500 g of glass beads having a diameter of 1 mm. Thereafter 100 g of surface-oxidized copper powder having an average particle diameter of 15 μm, an average thickness of 0.3 μm and an oxygen content of 1.5% and 30 g of mineral spirit were added into this pot mill, and the mixture was further subjected to ball milling dispersion for 1 hour. Obtained slurry was washed out with 500 g of mineral spirit to be separated from the glass beads and thereafter filtrated, thereby obtaining a red colored flake pigment (primary colored flake pigment).

Then, 2 g of acrylic acid, 2 g of trimethylolpropane triacrylate, 2 g of styrene and 2 g of epoxidized polybutadiene were added to slurry obtained by dispersing 100 g (as a solid content) of the primary colored flake pigment obtained in the above in 500 g of mineral spirit and heated/stirred under a nitrogen atmosphere at 80° C. for polymerizing the monomers while adding 0.5 g of azobisisobutylnitrile as a polymerization initiator and precipitating the same on the surface of the primary colored aluminum pigment. The treated slurry was solid-liquid separated, for obtaining a pasty colored flake pigment having a solid content of 85%.

The obtained colored flake pigment exhibited an average particle diameter of 15 μm, an average thickness of 1.0 μm and true specific gravity of 3.6. The surface-oxidized copper powder employed at this time exhibited light reflectance of 41% in the wave range of 300 nm to 600 nm.

Example 3

0.05 g of benzoic acid, 0.05 g of a dispersant (Prene Act ALM by Kawaken Fine Chemicals Co., Ltd.) and 30 g of mineral spirit were added to 5 g of a commercially available quinacridone-based pigment (Shinkasha Magenta RT-355-D by Ciba Speciality Chemicals) and subjected to ball milling dispersion for 24 hours in a pot mill having a diameter of 5 cm and an internal volume of 500 cc loaded with 500 g of glass beads having a diameter of 1 mm. Thereafter 50 g of an iron oxide-covered colored aluminum pigment (GD2600 by Toyo Aluminum Kabushiki Kaisha.) having an average particle diameter of 17 μm and an average thickness of 1.2 μm and 30 g of mineral spirit were added into this pot mill, and the mixture was further subjected to ball milling dispersion for 1 hour. Obtained slurry was washed out with 500 g of mineral spirit to be separated from the glass beads and thereafter filtrated, thereby obtaining a red colored flake pigment (primary colored flake pigment).

Then, 1.5 g of acrylic acid, 1.5 g of trimethylolpropane triacrylate, 1.5 g of styrene and 1.5 g of epoxidized polybutadiene were added to slurry obtained by dispersing 50 g (as a solid content) of the primary colored flake pigment obtained in the above in 500 g of mineral spirit and heated/stirred under a nitrogen atmosphere at 80° C. for polymerizing the monomers while adding 0.5 g of azobisisobutylnitrile as a polymerization initiator and precipitating the same on the surface of the primary colored aluminum pigment. The treated slurry was solid-liquid separated, for obtaining a pasty colored flake pigment having a solid content of 85%.

The obtained colored flake pigment exhibited an average particle diameter of 17 μm, an average thickness of 1.8 μm and true specific gravity of 2.3. The iron oxide-covered aluminum pigment employed at this time exhibited light reflectance of 35% in the wave range of 300 nm to 600 nm.

Example 4

0.1 g of benzoic acid, 0.1 g of a dispersant (Prene Act ALM by Kawaken Fine Chemicals Co., Ltd.) and 30 g of mineral spirit were added to 10 g of a commercially available dioxazine-based pigment (Hostaperm Violet RL NF by Hoechst Japan Ltd.) and subjected to ball milling dispersion for 24 hours in a pot mill having a diameter of 5 cm and an internal volume of 500 cc loaded with 500 g of glass beads having a diameter of 1 mm. Thereafter 100 g of nickel powder having an average particle diameter of 20 μm, an average thickness of 0.08 μm upon surface oxidization in the air at 500° C. and an oxygen content of 2.8% and 30 g of mineral spirit were added into this pot mill, and the mixture was further subjected to ball milling dispersion for 1 hour. Obtained slurry was washed out with 500 g of mineral spirit to be separated from the glass beads and thereafter filtrated, thereby obtaining a violet colored flake pigment (primary colored flake pigment).

Then, 2 g of acrylic acid, 2 g of trimethylolpropane triacrylate, 2 g of styrene and 2 g of epoxidized polybutadiene were added to slurry obtained by dispersing 100 g (as a solid content) of the primary colored flake pigment obtained in the above in 500 g of mineral spirit and heated/stirred under a nitrogen atmosphere at 80° C. for polymerizing the monomers while adding 0.5 g of azobisisobutylnitrile as a polymerization initiator and precipitating the same on the surface of the primary colored aluminum pigment. The treated slurry was solid-liquid separated, for obtaining a pasty colored flake pigment having a solid content of 85%.

The obtained colored flake pigment exhibited an average particle diameter of 20 μm, an average thickness of 0.2 μm and true specific gravity of 4.2. The surface-oxidized nickel powder employed at this time exhibited light reflectance of 62% in the wave range of 300 nm to 600 nm.

Example 5

0.1 g of benzoic acid, 0.1 g of a dispersant (Prene Act ALM by Kawaken Fine Chemicals Co., Ltd.) and 30 g of mineral spirit were added to 3 g of a commercially available azomethine metal complex-based pigment (Irgazin Yellow 5GLT by Ciba Speciality Chemicals) and subjected to ball milling dispersion for 24 hours in a pot mill having a diameter of 5 cm and an internal volume of 500 cc loaded with 500 g of glass beads having a diameter of 1 mm. Thereafter 100 g of silicon oxide-covered bronze powder (Cu/Zn=70/30, silicon oxide: 4%) having an average particle diameter of 35 μm and an average thickness of 1.5 μm and 30 g of mineral spirit were added into this pot mill, and the mixture was further subjected to ball milling dispersion for 1 hour. Obtained slurry was washed out with 500 g of mineral spirit to be separated from the glass beads and thereafter filtrated, thereby obtaining an orange colored flake pigment (primary colored flake pigment).

Then, 1 g of acrylic acid, 1 g of trimethylolpropane triacrylate, 1 g of styrene and 1 g of epoxidized polybutadiene were added to slurry obtained by dispersing 100 g (as a solid content) of the primary colored flake pigment obtained in the above in 500 g of mineral spirit and heated/stirred under a nitrogen atmosphere at 80° C. for polymerizing the monomers while adding 0.5 g of azobisisobutylnitrile as a polymerization initiator and precipitating the same on the surface of the primary colored aluminum pigment. The treated slurry was solid-liquid separated, for obtaining a pasty colored flake pigment having a solid content of 85%.

The obtained colored flake pigment exhibited an average particle diameter of 35 μm, an average thickness of 2.2 μm and true specific gravity of 6.1. The silicon oxide-covered bronze powder employed at this time exhibited light reflectance of 46% in the wave range of 300 nm to 600 nm.

Example 6

0.1 g of benzoic acid and 30 g of mineral spirit were added to 3 g of a commercially available phthalocyanine blue pigment (Cyanine Blue MR-3 by Toyo Ink Mfg. Co., Ltd.) and subjected to ball milling dispersion for 24 hours in a pot mill having a diameter of 5 cm and an internal volume of 500 cc loaded with 500 g of glass beads having a diameter of 1 mm. Thereafter 50 g of an iron oxide-covered colored aluminum pigment (GD2600 by Toyo Aluminum Kabushiki Kaisha.) having an average particle diameter of 17 μm and an average thickness of 1.2 μm and 30 g of mineral spirit were added into this pot mill, and the mixture was further subjected to ball milling dispersion for 1 hour. Obtained slurry was washed out with 500 g of mineral spirit to be separated from the glass beads and thereafter filtrated, thereby obtaining a green colored flake pigment (primary colored flake pigment).

Then, 1.5 g of acrylic acid, 1.5 g of trimethylolpropane triacrylate, 1.5 g of styrene and 1.5 g of epoxidized polybutadiene were added to slurry obtained by dispersing 50 g (as a solid content) of the primary colored flake pigment obtained in the above in 500 g of mineral spirit and heated/stirred under a nitrogen atmosphere at 80° C. for polymerizing the monomers while adding 0.5 g of azobisisobutylnitrile as a polymerization initiator and precipitating the same on the surface of the primary colored aluminum pigment. The treated slurry was solid-liquid separated, for obtaining a pasty colored flake pigment having a solid content of 85%.

The obtained colored flake pigment exhibited an average particle diameter of 17 μm, an average thickness of 1.8 μm and true specific gravity of 2.3. The silicon oxide-covered bronze powder employed at this time exhibited light reflectance of 35% in the wave range of 300 nm to 600 nm.

Comparative Example 1

0.5 g of benzoic acid, 0.5 g of a dispersant (Prene Act ALM by Kawaken Fine Chemicals Co., Ltd.) and 30 g of mineral spirit were added to 12 g of a commercially available red coloring pigment (Irgazin DPP Rubine TR by Ciba Speciality Chemicals) and subjected to ball milling dispersion for 24 hours in a pot mill having a diameter of 5 cm and an internal volume of 500 cc loaded with 500 g of glass beads having a diameter of 1 mm. Thereafter 42.8 g (30 g as a metal content) of commercially available aluminum paste (TCR3040 by Toyo Aluminum Kabushiki Kaisha.) and 30 g of mineral spirit were added into this pot mill, and the mixture was further subjected to ball milling dispersion for 1 hour. Obtained slurry was washed out with 500 g of mineral spirit to be separated from the glass beads and thereafter filtrated, thereby obtaining a primary colored aluminum pigment.

Then, 1 g of acrylic acid, 1 g of trimethylolpropane triacrylate, 1 g of styrene and 1 g of epoxidized polybutadiene were added to slurry obtained by dispersing 20 g (as a solid content) of the primary colored aluminum pigment obtained in the above in 200 g of mineral spirit and heated/stirred in nitrogen at 80° C. for polymerizing the monomers while adding 0.5 g of azobisisobutylnitrile as a polymerization initiator and precipitating the same on the surface of the primary colored aluminum pigment. The treated slurry was solid-liquid separated, for obtaining a pasty colored aluminum pigment having a solid content of 60%.

The obtained colored flake pigment exhibited an average particle diameter of 17 μm, an average thickness of 2.0 μm and true specific gravity of 1.8. The aluminum paste employed at this time exhibited light reflectance of 83% in the wave range of 300 nm to 600 nm.

Comparative Example 2

0.5 g of benzoic acid, 0.2 g of a dispersant (Prene Act ALM by Kawaken Fine Chemicals Co., Ltd.) and 30 g of mineral spirit were added to 6 g of a commercially available dioxazine-based pigment (Hostaperm Violet RL NF by Hoechst Japan Ltd.) and subjected to ball milling dispersion for 24 hours in a pot mill having a diameter of 5 cm and an internal volume of 500 cc loaded with 500 g of glass beads having a diameter of 1 mm. Thereafter 42.8 g (30 g as a metal content) of commercially available aluminum paste (TCR3040 by Toyo Aluminum Kabushiki Kaisha.) and 30 g of mineral spirit were added into this pot mill, and the mixture was further subjected to ball milling dispersion for 1 hour. Obtained slurry was washed out with 500 g of mineral spirit to be separated from the glass beads and thereafter filtrated, thereby obtaining a primary colored aluminum pigment.

Then, 0.3 g of acrylic acid, 1 g of trimethylolpropane triacrylate, 1 g of styrene and 1 g of epoxidized polybutadiene were added to slurry obtained by dispersing 20 g (as a solid content) of the primary colored aluminum pigment obtained in the above in 200 g of mineral spirit and heated/stirred in nitrogen at 80° C. for polymerizing the monomers while adding 0.5 g of azobisisobutylnitrile as a polymerization initiator and precipitating the same on the surface of the primary colored aluminum pigment. The treated slurry was solid-liquid separated, for obtaining a pasty colored aluminum pigment having a solid content of 60%.

The obtained colored flake pigment exhibited an average particle diameter of 17 μm, an average thickness of 1.2 μm and true specific gravity of 2.0.

Examples 7 to 12 and Comparative Example 3 and 4

Coating compositions having the following compositions were prepared from the colored flake pigments obtained in Examples 1 to 6 and comparative examples 1 and 2, and applied to steel plates prepared by performing polyester/melamine resin-based intercoating on surface-treated steel plates (steel plates of JISG3310 subjected to zinc phosphate-based chemical conversion) electrodeposited with a cationic electrodeposition coating material for automobiles.

Each of these steel plates subjected to electrodeposition coating and intercoating was air spray-coated with a coating composition for clear coating in a 2-coat 1-bake system and baked at 140° C. for 30 minutes, thereby forming a metallic coating film. The thicknesses of a colored base coat layer and a clear coat layer after hardening/drying were 20 μm and 40 μm respectively.

(Inventive Coating Composition for Colored Base Coat Layer)
Colored flake pigment (Examples 1 to 6 and comparative examples 1 and 2) (solid content): 10 parts
Thermosetting acrylic resin (solid content): 80 parts
Butylated melamine resin (solid content): 20 parts
(Coating Composition for Clear Coat Layer)
Thermosetting acrylic resin (solid content): 80 parts
Butylated melamine resin (solid content): 20 parts Table 1 shows results obtained by visually evaluating chroma and appearance (image clarity) of the obtained coated plates in five stages (improved as the numerical values are increased).

Table 1 also shows results obtained by testing weather resistance of the obtained coated plates with a super xenon accelerated weathering machine (Super Xenon Weathermeter SX75 by Suga Test Instruments) for 1000 hours and evaluating the degrees of discoloration thereof through color differences (square roots of the sums of squares of the respective differences of L*, a* and b* values of the coated plates before and after the test. No unit.) on a colorimeter ("CR300" by Minolta Camera Co., Ltd).

(Chroma)

Examples 7 to 11 and Comparative Examples 3 and 4

1: Pale red with low chroma.
2: Red, but insufficient in image clarity.
3: Ordinary red (equivalent to general red metallic).
4: Despite high chroma, slightly turbid.
5: Sharp red with extremely high chroma.

Example 12

1: Pale green with low chroma.
2: Green, but insufficient in image clarity.
3: Ordinary green (equivalent to general green metallic).
4: Despite high chroma, slightly turbid.
5: Sharp green with extremely high chroma.
(Appearance)
1: Protrusion of colored flakes with inferior luster on surface of coating film.

2: Irregularity on surface of coating film with rather inferior luster.

3: Coated surface substantially smooth, but insufficient in gloss.

4: Surface of coating film glossy.

5: Surface of coating film highly glossy.

TABLE 1

| | Used Colored Flake pigment | Chroma of Coating Film | Appearance of Coating Film | Weather Resistance of Coating Film |
|---|---|---|---|---|
| Example 7 | Example 1 | 5 | 4 | 1.3 |
| Example 8 | Example 2 | 4 | 5 | 0.6 |
| Example 9 | Example 3 | 5 | 4 | 0.4 |
| Example 10 | Example 4 | 4 | 5 | 1.5 |
| Example 11 | Example 5 | 5 | 3 | 0.5 |
| Example 12 | Example 6 | 4 | 4 | 0.3 |
| Comparative Example 3 | Comparative Example 1 | 3 | 3 | 7.4 |
| Comparative Example 4 | Comparative Example 2 | 5 | 5 | 10.2 |

From the results shown in Table 1, the coated plates according to Examples 7 to 12 coated with the coating compositions containing the inventive colored flake pigment bear comparison with comparative example 3 and comparative example 4 in film chroma and film appearance, and exhibit remarkably superior values as compared with comparative example 3 and comparative example 4 in relation to film weather resistance. It is understood from these results that excellent film chroma, film appearance and superior weather resistance can be compatibly attained by employing the coating composition containing the colored flake pigment according to the present invention.

The embodiment and Examples disclosed this time must be considered illustrative in all points and not restrictive. The range of the present invention is shown not by the above description but by the scope of claim for patent, and it is intended that all modifications within the meaning and range equivalent to the scope of claim for patent are included.

INDUSTRIAL APPLICABILITY

A coating film excellent in designability and weather resistance in various color gamuts including those of yellow and red, having heretofore been regarded as difficult due to inferior weather resistance, by using a coating material or ink employing the colored flake pigment according to the present invention.

The invention claimed is:

1. A colored flake pigment comprising a flaky base material and a coloring pigment bonded to said flaky base material, wherein said flaky base material is composed of a composite of aluminum flakes and particles of iron oxide, bismuth vanadate or a spinel pigment, and has light reflectance of not more than 80% in a wave range of 300 nm to 600 nm, and said particles having a particle diameter in the range of 10 to 80 nm, and said coloring pigment is present in an amount of 0.5 to 50 parts by mass with respect to 100 parts by mass of said flaky base material, said coloring pigment has a primary particle diameter in the range of 0.01 to 1 gm, and said coloring pigment is at least one pigment selected from the group consisting of a diketopyrrolopyrrole-based pigment, a quinacridone-based pigment, a perylene-based pigment, a perynone-based pigment, a dioxazine-based pigment, an anthraquinone-based pigment, an isoindolinone-based pigment, an isoindoline-based pigment, an indanthrone-based pigment, an ansanthrone-based pigment, a flavanthrone-based pigment, a pyranthrone-based pigment, a benzoimidazolone-based pigment, a phthalone-based pigment, a quinophthalone-based pigment, a triphenylmethane quinophthalone-based pigment, an anthrapyrimidine-based pigment, a thioindigo-based pigment, a phthalocyanine-based pigment, a phthalocyanine halide-based pigment, an azomethine metal complex-based or condensed azo-based pigment or another azo pigment, a chrome yellow-based pigment, titanium oxide, carbon black, ultramarine, iron blue, cobalt blue and chrome green.

2. The colored flake pigment according to claim 1, having an average particle diameter in the range of 1 to 50 μm, an average thickness in the range of 0.1 to 2 μm and true specific gravity in the range of 2 to 6.

3. The colored flake pigment according to claim 1, having a surface at least partially covered with resin.

4. The colored flake pigment according to claim 1, wherein said coloring pigment is present in an amount of 2 to 30 parts by mass with respect to 100 parts by mass of said flaky base material.

5. The colored flake pigment according to claim 1, wherein said aluminum flakes are covered with said particles of iron oxide, bismuth vanadate, or a spinel pigment.

6. A coating composition containing the colored flake pigment according to any one of claims 1, 2-4, and 5.

* * * * *